April 29, 1952 H. C. NOE 2,594,337
COUNTING MACHINE
Filed July 19, 1947 5 Sheets-Sheet 1

INVENTOR.
Harold C. Noe
BY
Ernest A. Joenen
ATTORNEY

April 29, 1952 H. C. NOE 2,594,337
COUNTING MACHINE
Filed July 19, 1947 5 Sheets-Sheet 3

INVENTOR.
Harold C. Noe
BY
Ernest A. Joenen
ATTORNEY

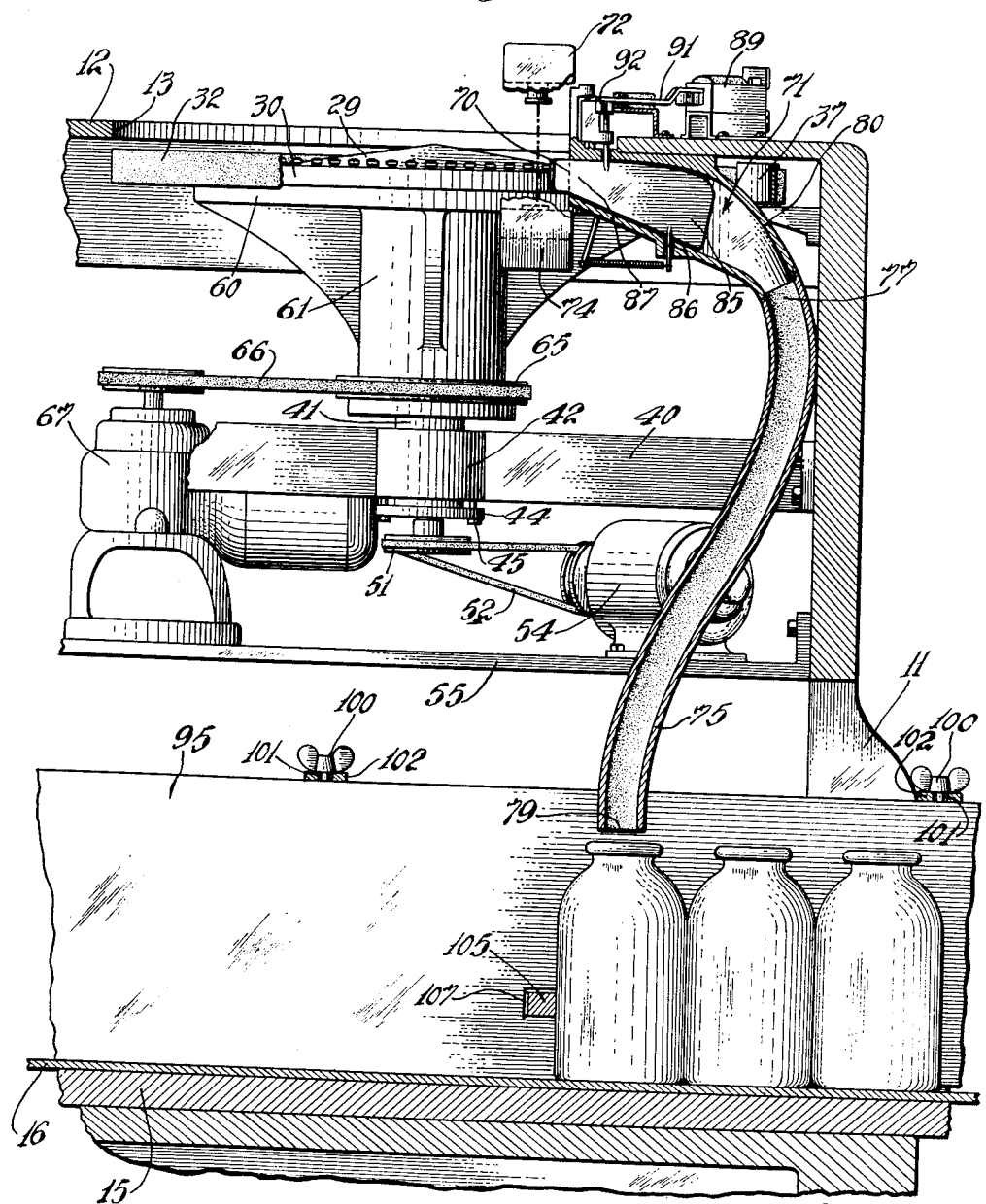

April 29, 1952     H. C. NOE     2,594,337
COUNTING MACHINE
Filed July 19, 1947     5 Sheets-Sheet 5
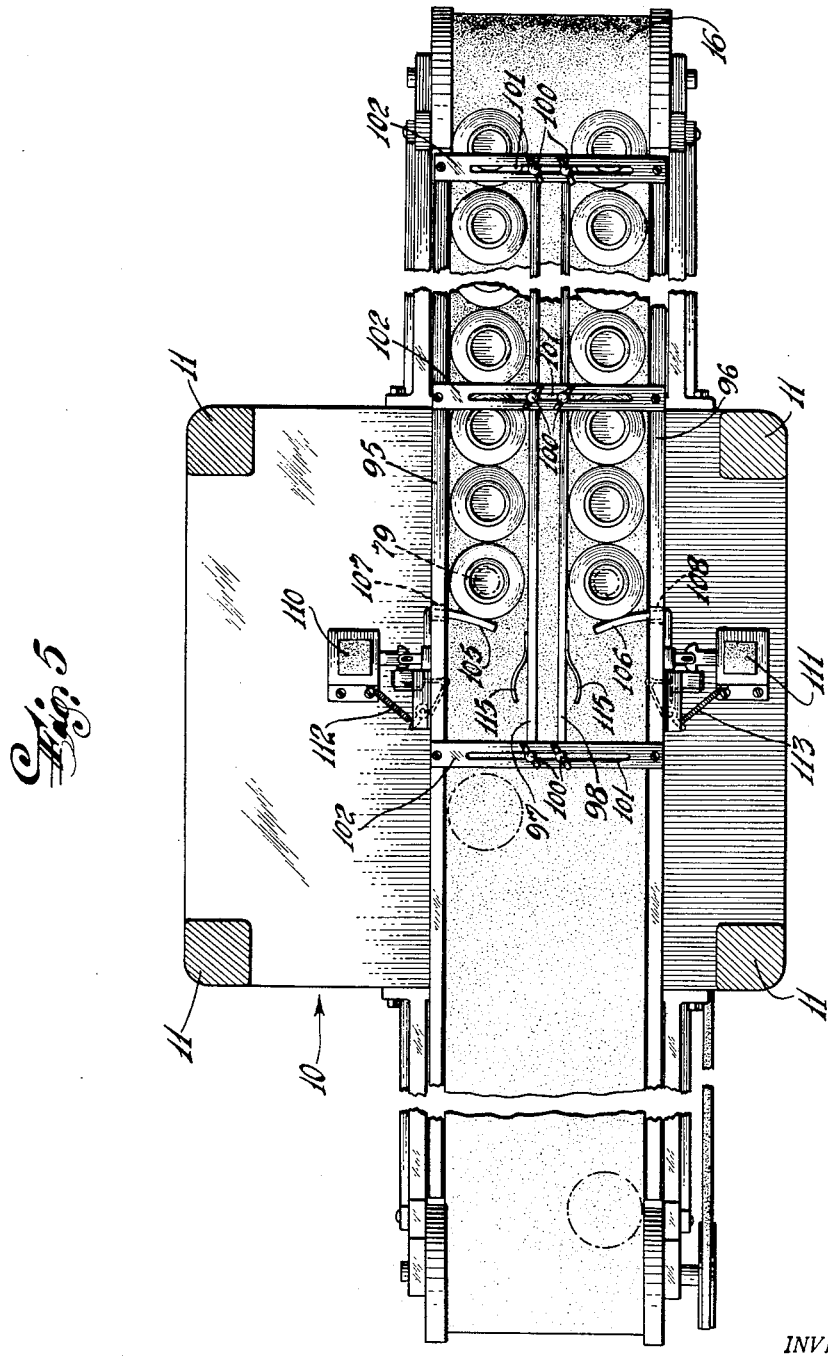
INVENTOR.
Harold C. Noe
BY
Ernest A. Joenen
ATTORNEY Patented Apr. 29, 1952

2,594,337

UNITED STATES PATENT OFFICE 2,594,337

COUNTING MACHINE

Harold C. Noe, Upper Montclair, N. J., assignor to Kidde Manufacturing Co., Inc., Bloomfield, N. J., a corporation of New Jersey Application July 19, 1947, Serial No. 762,018

15 Claims. (Cl. 198—30)

The present invention relates to machines for counting articles and more particularly to such machines wherein the articles are counted while moving at relatively high speed.

Heretofore, considerable difficulty has been encountered in counting articles or the like at a very rapid rate and in quantities of a predetermined number. In counting relatively small objects, such as medicinal pills, capsules, tablets, or the like, or delicate or minute radio tube parts, these difficulties are even more severe because the articles cannot withstand rough handling.

At present, tablets, capsules and pills are counted rather inefficiently. Where tablets are to be placed in a box, bottle or jar in large quantities, for example a thousand, the thousand tablets are counted out and then weighed to determine the weight of a thousand. Thereafter, tablets are weighed in lots having the weight of approximately a thousand, and a quantity of tablets equal to about three per cent by weight of such lots is added to take care of possible shortages. Where smaller quantities of tablets, for example fifty or a hundred, are to be packaged, a tray or rack is utilized which has cavities or spaces corresponding in number to the tablets to be counted. Each space is filled with a tablet and the excess tablets are removed. The rack is then emptied into a hopper or the like which delivers the pills to the container. It is apparent that these methods are costly due to the time consumed and the attendant labor costs, and due to the surplus tablets added to compensate for shortages.

Attempts have been made to develop machines which overcome the foregoing difficulties, but these attempts have been unsuccessful.

The present invention aims to provide a machine for counting articles automatically and at a very rapid rate and in large or small quantities of any given number, wherein the articles may be counted by electronic means adapted to control the operation of the machine.

Accordingly, an object of the invention is to provide an improved high speed counting machine.

Another object is to provide such a machine wherein the articles are arranged in single file relation to enable them to be counted by electronic means.

Another object is to provide a counting machine under the control of electronic means for accurately counting out quantities of articles of any predetermined number.

Another object is to provide a machine which is fully automatic in operation and does not require manual supervision.

Another object is to provide a machine for handling the articles without damage thereto.

Another object is to provide a machine adapted for handling articles of various shapes.

Another object is to provide a machine which is adjustable to accommodate articles of various desired sizes.

Another object is to provide a machine adapted to automatically handle the containers into which the counted articles are delivered.

Another object is to provide a machine adapted to accommodate containers of various sizes and shapes.

Another object is to provide a high speed machine wherein the articles are accelerated and decelerated slowly.

A further object is to provide a machine of the foregoing character which is relatively simple in construction, positive in operation and can readily withstand continuous usage with a minimum of service or repair.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specifiaction, wherein:

Fig. 4 is a sectional view, partly in elevation, taken substantially along the line 4—4 on Fig. 3, illustrating details of the upper portion of the machine.

Fig. 5 is a plan view of conveyor means for handling the containers to which the counted articles are delivered.

Described generally, the counting machine comprises electronic counting means including a beam of light directed on a photocell, and means for separating and arranging the articles to be counted in single file relation and passing them through the beam of light to interrupt the same and effect operation of the counting means. The counted articles are delivered to means for conducting them to a container. Two such means are provided and switch means, such as a gate, determines to which of the conducting means the articles are delivered. The counting means are of the type which, upon reaching a predetermined count, give out a pulse which is amplified to operate gate switching means. The latter means effects operation of means to release the container having the desired number of articles therein to permit it to be conveyed away from the article receiving station.

Figure 1:
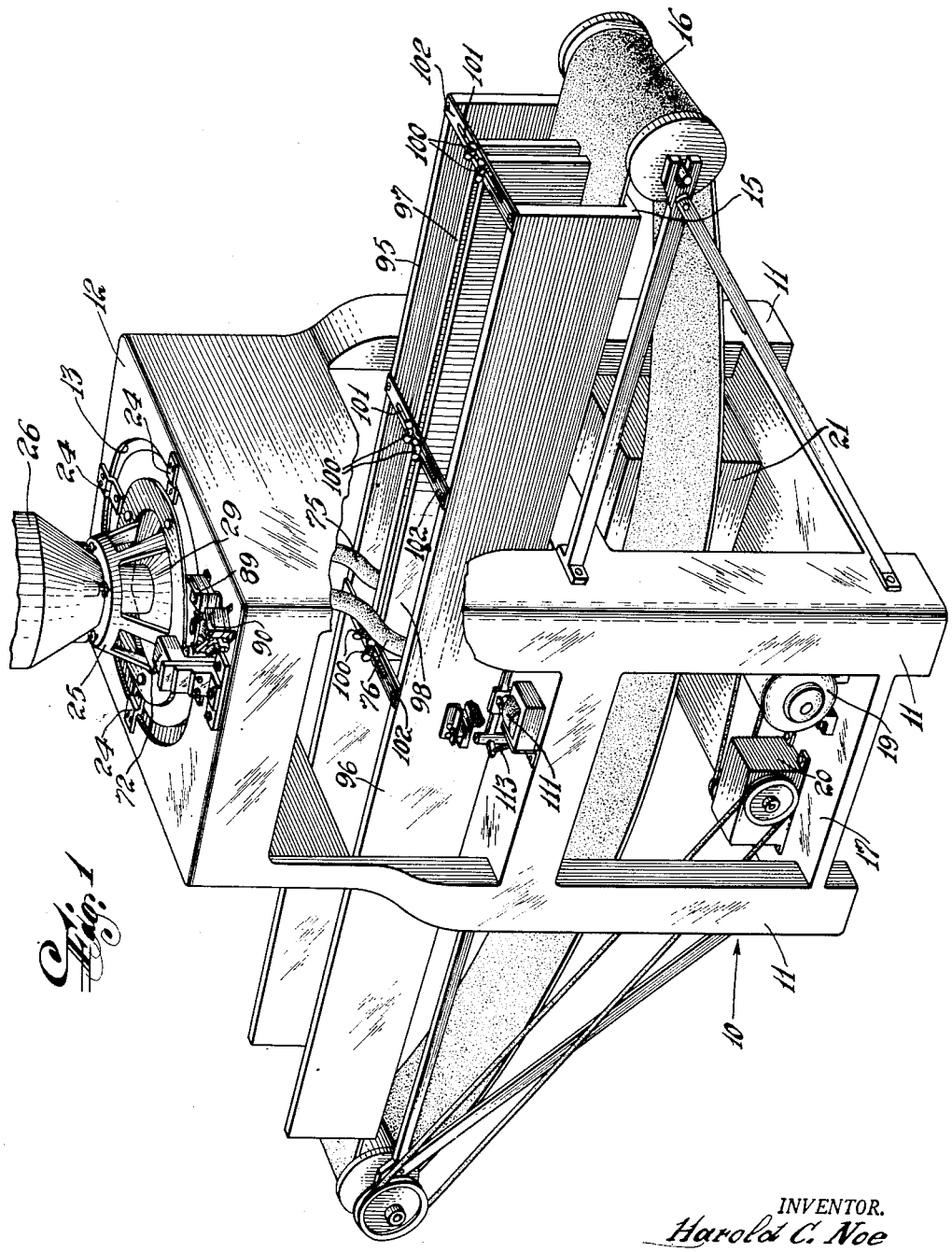
Fig. 1 is a perspective view of a counting machine in accordance with the present invention.

Referring more particularly to Fig. 1 of the drawings, there is shown a machine in accordance with the present invention which comprises a frame 10, having legs 11, a top 12 mounted on the legs and formed with a circular opening 13 for receiving article arranging means, a laterally extending runway 15 below the top for an endless conveyor 16, and a lower platform 17 for supporting a motor 19 and gear box 20 for driving the conveyor 16 and for supporting an electronic counting unit contained in a box or cabinet 21.

Figure 2:
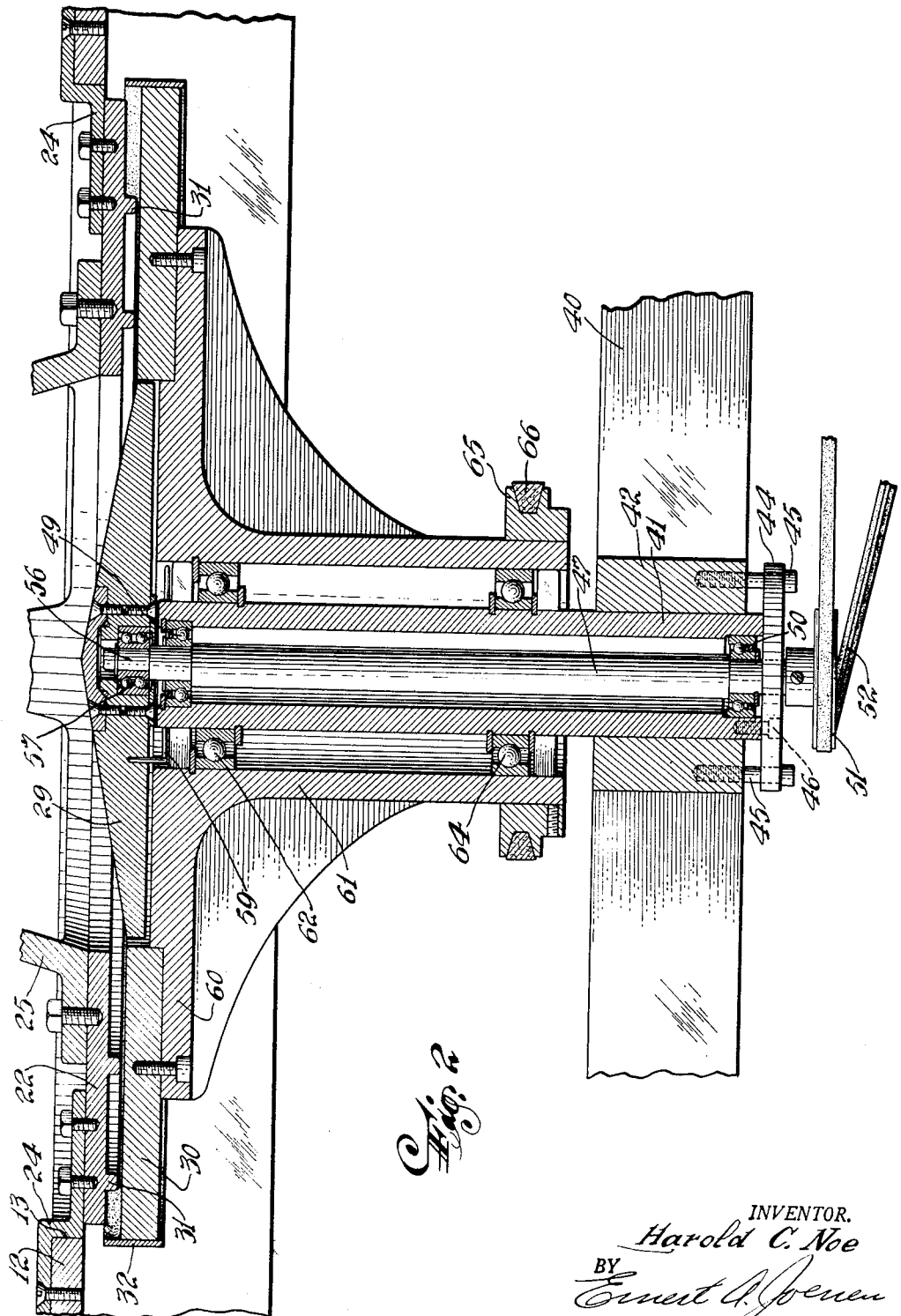
Fig. 2 is an enlarged sectional view of the upper portion of the machine shown in Fig. 1, taken substantially along the line 2—2 on Fig. 3.

As shown in Fig. 2, an annular frame 22 serving as a cover member is supported in the opening 13 by members 24 bolted thereto and secured to the top 12. At the inner periphery of the frame, a cage 25 is secured for supporting a hopper 26 (Fig. 1) adapted to feed articles to the arranging means.

The article arranging means generally comprise of a circular vibrating table 29 preferably having a slightly conical or outwardly sloping top for receiving articles passing through the hopper, and an annular rotating platform 30 surrounding the table 29 for receiving articles therefrom and for revolving the articles and thrusting them radially outwardly by centrifugal force. If desired, the table 29 could be rotated instead of or in addition to being vibrated.

A guide 31, generally in the form of a spiral, on the underside of the frame 22 (Figs. 2 and 3) guides the articles outwardly as they are revolved. The spiral has several convolutions, for example, two as shown, whereby the articles are revolved to provide opportunity for them to be arranged in single file relation. The spiral is illustrated herein as being stationary whereby upon rotation of the platform 30 relative rotative movement between the spiral and platform is effected.

An endless belt 32 partially surrounds the outer periphery of the platform 30 and extends upwardly with respect to the platform to provide a moving outer wall for receiving and guiding the articles to the counting station. An opening is formed in the outer wall at the counting station by passing the belt over idler pulleys 34, 35, 36, 37 and 38 (Fig. 3) which serve to space the belt from the platform for a circumferential distance of about 45°. The belt is driven by the platform as shown, but it will be apparent that independent drive means for moving the belt at a slower or faster speed than the periphery of the platform could be provided.

Referring again to Figure 2, the table 29 and the platform are supported by a spider 40 mounted on the legs 11 of the frame below the top 12 in the manner about to be described. A vertical sleeve 41 has its lower end positioned for upward and downward movement in the hub 42 of the spider and is supported by a yoke 44 secured to the underside of the hub by bolts 45. The sleeve is held aainst rotative movement by a bolt 46 threaded through the yoke and is adapted to be raised or lowered by adjustment of the bolts 45 for the purpose described hereinafter.

A shaft 47 is journalled in the sleeve 41 by upper and lower bearings 49 and 50 and has a pulley 51 at its lower end for receiving a belt 52 driven by a motor 54 supported on a platform 55 below the spider (Fig. 4). The upper end of the shaft 47 has a slightly eccentric stud 56 housed in a bearing 57 secured in a recess at the underside of the table 29. The table 29 is thus supported by the shaft 47, and may be held against rotation by a wire 59 secured to the upper end of the sleeve 41 whereby, upon rotation of the shaft 47, vibrating or oscillating movement is imparted to the table by the eccentric.

The rotatable platform 30 is secured to the flange 60 of a hub or sleeve 61 extending about the sleeve 41 and rotatably supported thereon by upper and lower bearings 62 and 64. The lower end of the sleeve 61 has a pulley 65 thereon for receiving a belt 66 driven by a motor 67 supported on the platform 55.

Since the table shaft 47 and the platform sleeve 61 are mounted on the sleeve 41 for upward or downward movement therewith, adjustment of the bolts 45 determines the position of the sleeve 41 and the position of the table 29 and the platform 30 with respect to the annular frame 22 carrying the spiral 31, whereby the space between the frame 22 and the platform 30 may be varied to accommodate articles of different heights or thicknesses.

Figure 3:
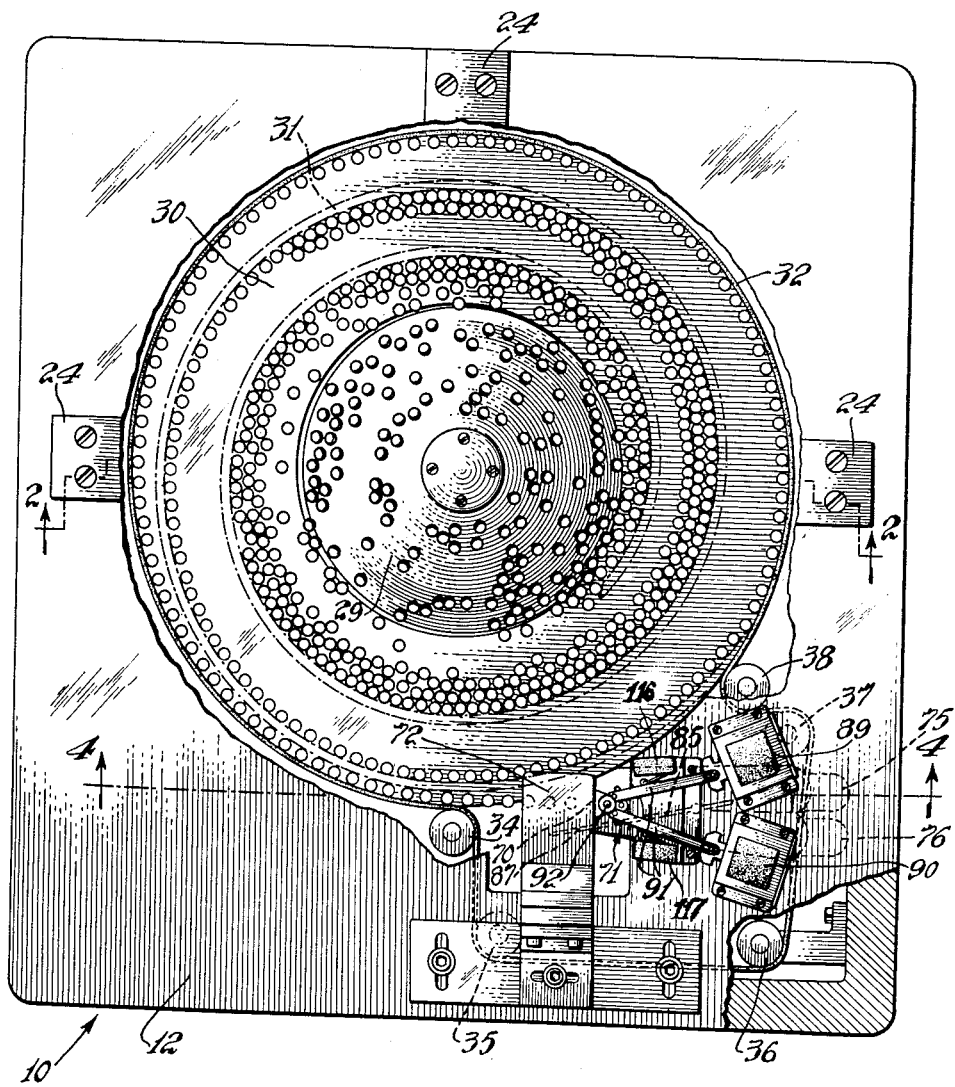
Fig. 3 is a plan view of the upper portion of the machine as shown in Fig. 1 with certain parts broken away for clearness.

As shown in Figs. 3 and 4, the articles on the rotating platform 30 are delivered to the mouth or opening 70 of an article receiving receptacle 71 spaced from the point at which the articles leave the platform, whereby the articles are projected through space. At this space, a beam of light is projected by a light source 72 on a photocell 74. The beam extends through the path of the articles and is interrupted each time an article passes therethrough to cause the photocell to respond, which in turn actuates the counter 21, as will be described hereinafter.

A pair of tubes 75 and 76 are arranged side by side and each has an entrance opening 77 in communication with the receiving receptacle 71. The tubes extend downwardly to the filling station and each has an outlet 79 for delivering the articles to the containers to be filled. The rear wall 80 of the receptacle 71 curves downwardly gradually and the tubes 75 and 76 have an ogee curve contour (Fig. 4) adapted to gradually translate the forward horizontal movement of the articles into downward movement, whereby the speed of movement of the articles is gradually reduced and the articles are conducted to the containers to be filled without rough handling or damage thereto.

In order to enable predetermined numbers of articles to be directed alternately into the tubes 75 and 76, a vertical gate or switch 85 is pivotally mounted in the receptacle 71 at a point 86 substantially at the middle thereof and suitable means are provided for moving the forward end 87 of the gate into one of two positions whereby the articles will be deflected into one or the other of the tubes. Such means comprises a pair of solenoids 89 and 90 connected by linkage 91 to the gate at 92. The solenoids are actuated alternately by the electronic counter each time a predetermined number of articles has entered one of the tubes, as will be described hereinafter.

In Figs. 4 and 5 the containers are shown delivered by the belt conveyor 16 to the filling station. The containers are guided in a pair of rows by vertical side walls 95 and 96 and a pair of intermediate vertical walls 97 and 98. The walls 97 and 98 are adjustably mounted with respect to the walls 95 and 96, respectively, by wing nuts 100 positioned in slots 101 of horizontal bars 102 extending from the wall 95 to the wall 96, whereby containers of various diameters may be accommodated.

In order to retain the first container in each row at the filling station, gates or stops 105 and 106 extend through openings 107 and 108 in the side walls 95 and 96, respectively. The gates 105 and 106 are adapted to be moved out of the path of the container momentarily by solenoids 110 and 111, respectively, and are adapted to be returned by springs 112 and 113, respectively. Energization of the solenoids 110 and 111 is controlled by switch means 116 and 117 (Figure 3), respectively, which are actuated by the linkage members 91 for operating the gate 85.

The containers, after being released and moved by the belt conveyor, engage resilient switch operating members 115 mounted on the walls 97 and 98 to render the solenoids 110 and 111 ineffective and to enable the springs 112 and 113 to return the gates 105 and 106 to their container retaining position.

The specific details of the counter do not constitute part of the present invention and are not shown. A suitable form of counter is one of the electronic type manufactured by Potter Instrument Co., Flushing, L. I., N. Y. Likewise, it is not deemed necessary to illustrate the electrical connections, since the circuits for alternately energizing the gate solenoids 89 and 90 in response to impulses from the counter and the circuits including the switch means 116 and 117 operated by the movement of the gate for energizing the solenoids 110 and 111, respectively, are relatively simple and present no unusual problem.

In operation, containers are placed on the conveyor belt 16 which moves them to the position shown in Fig. 5 where they are retained by the closed gates 105 and 106, while the conveyor belt slips under the stationary containers. The electronic counter 21 is adjusted to count the desired number of articles before giving out a solenoid operating impulse, and the switch gate 85 is positioned to direct articles into the tube 75, for example.

The table 29 is vibrated by its drive, the platform 30 is rotated by its drive, and articles are placed in the hopper 26 and are fed to the table 29 at the center thereof. The articles will tend to pile up at the center but due to its cone-like shape and its vibrations, the articles are agitated and expand radially outwardly to the periphery of the table in a single layer (Fig. 3).

When the articles move across the periphery of the table they are deposited on the rotating platform which revolves them along the stationary spiral guide 31. The revolving articles contacting the stationary spiral are given a spinning or rotary motion and these articles impart such motion to articles adjacent thereto to effect separation and arrangement of the articles, so that upon reaching the end of the spiral they tend to arrange themselves in single file relation. Upon leaving the end of the spiral, the articles contact the belt 32, providing the side wall of the platform 30 and are revolved for approximately one more revolution. Upon contacting the belt, the spin imparted by the spiral tends to accelerate the speed of the articles to effect arrangement in single file relation. While in contact with the belt, rotation or spinning of the articles about their vertical axis is eliminated or greatly minimized.

When the machine is utilized for counting articles which do not spin, such as capsules, hexagonal nuts, etc., alignment thereof is effected but at a somewhat reduced capacity.

The articles are projected tangentially from the platform at the opening in the side wall formed by leading the belt around the pulleys 34 and 35, and move in a straight line path into the middle of the mouth or opening 70 of the article receiving receptacle 71. The gate 85, by being set to block off the tube 76, directs the articles to the tube 75 which conveys and delivers them to the container beneath the outlet 79 of the tube 75. As the articles pass through the space between the outer edge of the platform 29 and the receptacle 71, they interrupt the beam directed on the photocell to cause the photocell through its circuit to actuate the counter.

When the desired number of articles have been counted, the counter admits current to the solenoid circuits to effect operation of the solenoid 89. As the last article of the desired count enters the receptacle 71, the solenoid 89 operates to effect switching of the gate 85 into a position to direct the next article into the tube 76, and the linkage member 91 connecting the gate and the solenoid 89 operates the switch 116 to effect operation of the solenoid 110 with moves the stop gate 105 out of the path of the container, whereupon the conveyor belt moves the container away from the filling station and advances the containers in a row controlled by the gate 105. The solenoid 110 is rendered ineffective when the released container contacts the member 115 whereupon the spring 112 returns the stop gate 105 to its initial position in time to stop the travel of the next container to reach the filling station in that row.

While the filled container advances to a take-off station on the conveyor 16, the container under the outlet of the tube 76 is being filled with a predetermined number of articles. When this has been accomplished, the counter circuit energizes the solenoid 90 to switch the gate to its initial position and the linkage member 91 operates the switch 117 to effect energization of the solenoid 111 which moves the gate 106 to release the filled container.

Articles are separated, fed, counted, and collected in containers continuously without interruption while the filled containers are released one by one from the filling station. In practice, it has been found that articles such as five grain aspirin tablets (about three eighths of an inch in diameter) can be counted easily at a rate of between about 5,000 and 12,000 a minute.

From the foregoing description, it will be seen that the present invention provides an improved machine for arranging articles and counting the same at extremely rapid rates. The machine is relatively simple in construction and efficient in operation. The articles are counted accurately and more rapidly than by any prior machine or method without inflicting damage thereto. The machine is rugged and can readily withstand continuous usage for long periods without shutdowns for repairs.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described and all statements of the scope of the invention which, as a matter of language, might be said to fall therebetween.

I claim:

1. In combination, a table having rapid vibratory movement for arranging articles in a single layer, means adjacent said table and rotated relatively thereto for receiving the articles from said table, and means associated with said last mentioned means for arranging and maintaining the articles in single file relation.

2. In combination, a rapidly rotating platform for receiving articles and projecting them outwardly, and a belt partially surrounding said platform arranged to provide a moving wall at the outer periphery of said platform.

3. In combination, a rotating horizontal circular platform adapted for receiving circular articles, a stationary spiral guide of several convolutions mounted over said platform having vertical walls adapted to be engaged by the outer periphery of the articles and arrange the articles in spaced apart single file relation while causing spinning motion to be imparted thereto, and a vertical wall moving with said platform for a portion of the outer periphery thereof and positioned adjacent the outer end of said spiral guide to which articles having spinning motion are delivered by said guide, said platform wall being engaged by the outer periphery of the articles and being effective to maintain the articles in their spaced apart relation and to minimize the spinning thereof, said platform wall having an opening therein through which the articles are projected by said platform.

4. In apparatus of the class described, the combination of an annular rotatable platform, means for rapidly rotating said platform, a circular table for receiving articles positioned within said platform with its upper surface at its outer periphery in substantially fixed horizontal alignment with the upper surface at the inner periphery of said platform, means for rapidly vibrating said table to arrange the articles in a single layer and causing the same to be delivered to said platform, and means associated with said platform for arranging and maintaining the articles in single file spaced apart relation and for causing the articles to be projected from said platform in a straight path at a high rate of speed.

5. In apparatus according to claim 4, wherein the upper surface of said tables slopes downwardly and radially outwardly.

6. In apparatus of the class described, the combination of a rotatable platform for receiving articles, means for rapidly rotating said platform, means cooperating with said platform to arrange the articles in single file spaced apart relation, and a belt partially surrounding said platform and extending upwardly thereof to be engaged by the articles to provide a discontinuous wall moving with said platform having an opening therein through which the articles are adapted to be projected from said platform, said platform and said belt cooperating to maintain the articles in their spaced apart single file relation and to cause the articles to be projected at a high rate of speed and in a straight line through said opening.

7. In apparatus for arranging articles in single file spaced apart relation and projecting the same through space to facilitate counting thereof by photoelectrically controlled counting means, the combination of a rotatable platform, means for rapidly rotating said platform, means for delivering articles to the centrally inward portion of said platform, a belt partially surrounding said platform and extending upwardly therefrom at the outer periphery thereof to provide a wall moving with said platform having an opening therein through which the articles are adapted to be projected from said platform, and a spiral guide so positioned above said platform to be engaged to articles thereon, said guide having several convolutions and extending from said article delivering means to said belt beyond said opening, whereby said platform and guide cooperate to arrange the articles in single file spaced apart relation and said platform and belt cooperate to maintain the articles in such spaced apart relation and cause the articles to be projected at a high rate of speed through said opening.

8. In apparatus for arranging articles in single file spaced apart relation and projecting the same through space to facilitate counting thereof by photoelectrically controlled counting means, the combination of a rotatable platform, means for rapidly rotating said platform, means for delivering articles to the centrally inward portion of said platform, a belt partially surrounding said platform and extending upwardly therefrom at the outer periphery thereof to provide a wall moving with said platform having an opening therein through which the articles are adapted to be projected from said platform, and a cover member above and adjacently spaced from said platform having a spiral guide depending therefrom adapted to be engaged by articles on said platform, said guide having several convolutions and extending from said article delivering means to said belt beyond said opening, whereby said platform and guide cooperate to arrange the articles in single file spaced apart relation and said platform and belt cooperate to maintain the articles in such spaced apart relation and cause the articles to be projected at a high rate of speed through said opening.

9. Apparatus according to claim 8, wherein means are provided for adjustably mounting said cover member to vary the spacing thereof from said platform.

10. In apparatus for arranging articles in single file spaced apart relation and projecting the same through space to facilitate counting thereof by photoelectrically controlled counting means, the combination of an annular rotatable platform, means for rapidly rotating said platform, a circular table within said platform for receiving articles thereon, means for rapidly vibrating said table to cause said articles to be arranged in a single layer and be delivered to the inner periphery of said platform, a belt partially surrounding said platform and extending upwardly therefrom at the outer periphery thereof to provide a wall moving with said platform having an opening therein through which the articles are adapted to be projected from said platform, and a spiral guide so positioned above said platform to be engaged by articles thereon, said guide having several convolutions and extending from adjacent the inner periphery of said platform to said belt beyond said opening, whereby said platform and guide cooperate to arrange the articles in single file spaced apart relation and said platform and belt cooperate to maintain the articles in such spaced apart relation and cause the articles to be projected at a high rate of speed through said opening.

11. Apparatus according to claim 10, wherein said table slopes downwardly and outwardly and has its outer periphery fixed in substantially horizontal alignment with the inner periphery of said platform.

12. In apparatus for arranging articles in single file spaced apart relation and projecting the same through space to facilitate counting thereof by photoelectrically controlled counting means, the combination of a rotatable platform, means for rapidly rotating said platform, means for delivering articles to the centrally inward portion of said platform, a belt partially surrounding said platform and extending upwardly therefrom at the outer periphery thereof to provide a wall moving with said platform having an opening therein through which the articles are adapted to be projected from said platform, a spiral guide so positioned above said platform to be engaged by articles thereon, said guide having several convolutions and extending from said article delivering means to said belt beyond said opening, whereby said platform and guide cooperate to arrange the articles in single file spaced apart relation and said platform and belt cooperate to maintain the articles in such spaced apart relation and cause the articles to be projected at a high rate of speed through said opening, means spaced from said opening and positioned for receiving the articles projected from said platform, and photoelectric means between said opening and said last means for directing a beam of light transversely across the path in which the articles are projected.

13. In apparatus for arranging articles and projecting the same through space to facilitate counting thereof by photoelectrically controlled counting means, the combination of a rotatable platform, means for rapidly rotating said platform, means for delivering articles to said platform, means cooperating with said platform to arrange the same in single file spaced apart relation and delivering them to the outer periphery of said platform, a pair of spaced apart pulleys adjacent said platform, idler means spaced from said platform, and a belt partially surrounding said platform and extending upwardly thereof to be engaged by the articles, said belt extending between said pulleys and said platform and extending about said idler means to provide a discontinuous wall moving with said platform having an opening therein through which the articles are adapted to be projected from said platform, said platform and said belt cooperating to maintain the articles in their spaced apart relation and to cause the articles to be projected at a high rate of speed through said opening.

14. In apparatus for arranging articles in single file spaced apart relation and projecting the same through space to facilitate counting thereof by photoelectrically controlled counting means, the combination of a rotatable platform, means for rapidly rotating said platform, means for delivering articles to the centrally inward portion of said platform, a pair of spaced apart pulleys adjacent said platform, idler means spaced from said platform, a belt partially surrounding said platform and extending upwardly therefrom at the outer periphery thereof, said belt extending between said pulleys and said platform and extending about said idler means to provide a discontinuous wall moving with said platform having a fixed opening therein through which the articles are adapted to be projected from said platform, and a spiral guide so positioned above said platform to be engaged by articles thereon, said guide having several convolutions and extending from said article delivering means to said belt beyond said opening, whereby said platform and guide cooperate to arrange the articles in single file spaced apart relation and said platform and belt cooperate to maintain the articles in such spaced apart relation and cause the articles to be projected at a high rate of speed through said opening.

15. In combination, a rotating horizontal circular platform for receiving articles, a belt surrounding said platform, a major portion thereof extending upwardly therefrom to provide a wall moving with said platform having an opening therein, and a stationary spiral guide adjacently above said platform, said guide having a plurality of convolutions spaced apart along the diameter of said platform a distance several times greater than the maximum dimension of the articles to be guided thereby, the outermost convolution of said guide approaching said belt and being spaced therefrom at one side of said opening to provide a passageway for the articles and being adjacent thereto at the other side of said opening to guide the articles to said belt.

HAROLD C. NOE.

REFERENCES CITED

The following references are of record in the file of this patent:

UNITED STATES PATENTS

| Number | Name | Date |
|---|---|---|
| 971,999 | Hodge | Oct. 4, 1910 |
| 1,708,664 | Danberg | Apr. 9, 1929 |
| 1,862,351 | Hagiwara | June 7, 1932 |
| 1,924,624 | Roesen | Aug. 29, 1933 |
| 1,987,873 | Scheu et al. | Jan. 15, 1935 |
| 2,103,387 | Salfisberg | Dec. 28, 1937 |
| 2,122,710 | Bidwell et al. | July 5, 1938 |
| 2,144,708 | Rau | Jan. 24, 1939 |
| 2,280,522 | Hahn | Apr. 21, 1942 |
| 2,304,982 | Wilkens | Dec. 15, 1942 |
| 2,417,074 | Green | Mar. 11, 1947 |
| 2,493,464 | Nelson | Jan. 3, 1950 |